Patented June 14, 1932

1,863,265

UNITED STATES PATENT OFFICE

WILLIAM BRADLEY, OF LONDON, AND RHYS JENKIN LOVELUCK AND ROBERT FRASER THOMSON, OF GRANGEMOUTH, ENGLAND, ASSIGNORS TO IMPERIAL CHEMICAL INDUSTRIES LIMITED, A CORPORATION OF GREAT BRITAIN

PRODUCTION OF ANTHRAQUINONE DERIVATIVES

No Drawing. Application filed September 19, 1931, Serial No. 563,890, and in Great Britain August 14, 1930.

This invention relates to an improved method for the production of arylsulphonyl compounds of 1-halogeno-5-aminoanthraquinone, which are important intermediates for the manufacture of 1-halogeno-5-aminoanthraquinone.

There has already been described by Ullmann in British Specification No. 16,272/10 a method for the replacement of halogen by an arylsulphonamido group by the action of arylsulphonamides upon halogenated anthraquinones, and in Example 3 of that specification Ullmann describes the interaction of 1:5-dichloroanthraquinone with benzenesulphonamide in hot nitrobenzene in presence of an acid absorber (potassium carbonate) and a copper catalyst (copper acetate), to give 1:5-di (benzenesulphonamide) anthraquinone.

The replacement of only one of the chlorine atoms in 1:5-dichloroanthraquinone has however always been a matter of considerable difficulty. There is usually produced a mixture of products, from which the pure monochloro-compound is not readily isolated. The best yields do not exceed 40% of the theoretical.

We have now found that by a modification of Ullmann's method, 1-chloro-5-arylsulphonamidoanthraquinone may be obtained in excellent yields (80% or more), and a convenient route is thereby provided for the manufacture of 1-chloro-5-aminoanthraquinone. The modification according to our invention consists in the use of a high-boiling organic liquid medium, in which the desired product is substantially insoluble at the temperature of reaction. For this purpose we have chosen o-dichlorobenzene as the solvent, and we conduct the reaction at or near the boiling point of the mixture, namely about 175–180° C., and in all cases above about 155° C. We use an acid-absorber and a copper catalyst, which are, in the preferred embodiment of our invention, pure potassium carbonate and a dry mixture of copper acetate and cuprous chloride, respectively. The quantity of arylsulphonamide to be employed is of course substantially less than that required to react with both chlorine atoms, but may be rather more than the equivalent of one chlorine atom if desired.

The arylsulphonyl group may be removed from the product by hydrolysis with sulphuric acid, and the hydrolysis product is obtained in a form readily purified by fractional precipitation from sulphuric acid.

The invention is illustrated but not limited by the following examples, in which the parts are by weight. To the first example there is appended a description of the method of converting the product into 1-chloro-5-aminoanthraquinone.

Example 1

50 parts of 1:5-dichloroanthraquinone are dissolved in 130 parts by volume of o-dichlorobenzene at the boil, and 38 parts of potassium carbonate (90–100%), 0.4 part of copper acetate, and 0.6 part of cuprous chloride added. The mixture is again raised to the boil and 37 parts of p-toluene-sulphonamide are added over 2½ hours. Boiling is continued for a further 2 hours, after which the mixture is steamed to remove o-dichlorobenzene, the precipitate filtered off, washed thoroughly with water and dried.

After hydrolysis, the 1-amino-5-chloroanthraquinone is purified by fractional precipitation from sulphuric acid.

The product is dissolved in 600 parts of 96% sulphuric acid and heated to 100° C. for 30–60 minutes. The solution is cooled to 80° C. and diluted to 80% sulphuric acid by the addition of water. Filtration is carried out at 80° C. the small residue consisting substantially of unconverted 1:5-dichloroanthraquinone amounting to less than 5% of the quantity originally taken.

The sulphuric acid filtrate is cooled to 20° C. and the precipitate filtered off and washed with a little cold 80% sulphuric acid. It is then treated with warm water, refiltered, washed acid free and dried. The product is 1-amino-5-chloroanthraquinone in substantially pure form, in yield of about 76%.

The cold sulphuric acid filtrate is drowned in water; when a further crop consisting of 1-amino-5-chloroanthraquinone and 1:5-diamino anthraquinone is obtained. This may be further separated from a smaller amount of sulphuric acid than previously used, when a further amount of 1-amino-5-chloroanthraquinone is obtained in yield of about 10–15%.

*Example 2*

50 parts of 1:5-dichloroanthraquinone and 150 parts by volume of o-dichlorobenzene are boiled with stirring and there are then added 3' parts of potassium carbonate of 99% purity, 0.4 parts of copper acetate and 0.6 part of cuprous chloride. The mixture is boiled again and there is then added over 2½ hours 37 parts of o-toluenesulphonamide. Boiling is then continued for a further 2 hours and the product isolated by steaming.

Hydrolysis and separation are effected as already described.

Other arylsulphonamides, e. g. benzenesulphonamide, may similarly be employed. We find it most convenient to use the easily accessible p-toluenesulphonamide. The invention has been described with respect only to 1:5-dichloroanthraquinone, but obviously other halogens may take the place of chlorine in this starting-material, e. g. 1:5-dibromoanthraquinone gives precisely similar results.

As many apparently widely different embodiments of this invention may be made without departing from the spirit and scope thereof, it is to be understood that we do not limit ourselves to the specific embodiments thereof except as defined in the appended claims.

We claim:

1. Process for the manufacture of 1-halogeno - 5 - arylsulphonamidoanthraquinones, comprising the interaction of 1:5-dihalogenoanthraquinone at a temperature above 155° C. with substantially less than two molecular proportions of an arylsulphonamide in presence of an acid-absorber and a copper catalyst in a high-boiling organic liquid medium in which the desired product is substantially insoluble at the temperature of reaction.

2. Process for the manufacture of 1-chloro-5 - p - toluene - sulphonamidoanthraquinone, comprising the interaction at a temperature above 155° C. of 1:5-dichloroanthraquinone with about three-quarters of its weight of p-toluenesulphonamide in hot o-dichlorobenzene in presence of potassium carbonate as acid-absorber and of a copper catalyst.

3. Process as claimed in claim 2 in which the copper catalyst comprises a mixture of copper acetate and cuprous chloride.

In testimony whereof we affix our signatures.

WILLIAM BRADLEY.
RHYS JENKIN LOVELUCK.
ROBERT FRASER THOMSON.

CERTIFICATE OF CORRECTION.

Patent No. 1,863,265.

June 14, 1932.

WILLIAM BRADLEY ET AL.

It is hereby certified that error appears in the printed specification of the above numbered patent requiring correction as follows: Page 1, line 69, for "(90-100%)" read (99-100%); and that the said Letters Patent should be read with this correction therein that the same may conform to the record of the case in the Patent Office.

Signed and sealed this 27th day of September, A. D. 1932.

(Seal)

M. J. Moore,
Acting Commissioner of Patents.